(12) United States Patent
Haimer (10) Patent No.: US 10,933,498 B2
(45) Date of Patent: Mar. 2, 2021

(54) DEVICE AND METHOD FOR INSERTING A TOOL INTO A TOOL RECEPTACLE

(71) Applicant: FRANZ HAIMER MASCHINENBAU KG, Hollenbach-Igenhausen (DE)

(72) Inventor: Franz Haimer, Hollenbach-Igenhausen (DE)

(73) Assignee: FRANZ HAIMER MASCHINENBAU KG, Hollenbach-Igenhausen (DE)

( * ) Notice: Subject to any disclaimer, the term of this patent is extended or adjusted under 35 U.S.C. 154(b) by 89 days.

(21) Appl. No.: 16/094,665

(22) PCT Filed: Apr. 18, 2017

(86) PCT No.: PCT/EP2017/059161
§ 371 (c)(1),
(2) Date: Oct. 18, 2018

(87) PCT Pub. No.: WO2017/182457
PCT Pub. Date: Oct. 26, 2017

(65) Prior Publication Data
US 2019/0118314 A1    Apr. 25, 2019

(30) Foreign Application Priority Data

Apr. 18, 2016 (DE) .................. 10 2016 206 515.7

(51) Int. Cl.
*B23P 11/02* (2006.01)
*B23Q 17/09* (2006.01)
(Continued)

(52) U.S. Cl.
CPC ......... *B23P 11/027* (2013.01); *B23B 31/1179* (2013.01); *B23P 11/025* (2013.01);
(Continued)

(58) Field of Classification Search
CPC ....... B23P 11/025; B23P 11/027; B23P 19/04; B23P 19/105; B23P 19/112; B23P 19/10;
(Continued)

(56) References Cited

U.S. PATENT DOCUMENTS 5,263,753 A * 11/1993 Breu ................ B25J 15/0206
                                              294/196
5,566,436 A * 10/1996 Hirata ................ B23P 19/02
                                              29/33 K
(Continued)

FOREIGN PATENT DOCUMENTS

DE    202004013916 U1    1/2006
DE    102005003927 A1    9/2006
(Continued)

OTHER PUBLICATIONS

International Application No. PCT/EP2017/059161, International Search Report and Written Opinion dated Oct. 23, 2017, 18 pages.

*Primary Examiner* — Jermie E Cozart
(74) *Attorney, Agent, or Firm* — Kilpatrick Townsend & Stockton LLP (57) ABSTRACT

The present invention provides a device (10) for inserting a tool (18) into a tool receptacle (14), said device comprising a first holding means (12), which is configured to hold a tool receptacle (14), a second holding means (16), which is configured to hold a tool (18), a linear guide (20), by means of which the second holding means (16) is able to move in relation to the first holding means (12) in an axial direction running along or parallel to a main axis (X) in order to move the tool closer to the tool receptacle and insert it into the tool receptacle, a sensing arrangement (40), which is able to move in an axial direction and is configured to sense in a contact-free manner an axial position of a first reference point (R1) associated with the first holding means and to sense in a contact-free manner an axial position of a second (Continued)

reference point (R2) for a tool held by the second holding means, and a measuring arrangement, which measures an axial displacement path of the sensing arrangement. The invention furthermore relates to a method for inserting a tool as well as a device having a clamping arrangement for holding the tool.

20 Claims, 6 Drawing Sheets (51) Int. Cl.
  *B23Q 17/24* (2006.01)
  *B23Q 17/22* (2006.01)
  *B23P 19/10* (2006.01)
  *B23P 19/04* (2006.01)
  *B23B 31/117* (2006.01)
  *B23P 19/12* (2006.01)

(52) U.S. Cl.
  CPC ............. *B23P 19/04* (2013.01); *B23P 19/10* (2013.01); *B23P 19/105* (2013.01); *B23Q 17/0923* (2013.01); *B23Q 17/225* (2013.01); *B23Q 17/2216* (2013.01); *B23Q 17/2409* (2013.01); *B23Q 17/2428* (2013.01); *B23Q 17/2461* (2013.01); *B23Q 17/2476* (2013.01); *B23P 19/12* (2013.01); *Y10T 29/49902* (2015.01)

(58) Field of Classification Search
  CPC ............ B23B 31/1179; B23Q 17/0923; B23Q 17/2216; B23Q 17/2225; B23Q 17/2409; B23Q 17/2428; B23Q 17/2461; B23Q 17/2476; Y10T 29/49902
  See application file for complete search history.

(56) References Cited

U.S. PATENT DOCUMENTS

| | | |
|---|---|---|
| 5,992,860 A | 11/1999 | Marquart |
| 6,179,279 B1* | 1/2001 | Asai .................. B25B 1/10 |
| | | 269/164 |
| 7,060,951 B2 | 6/2006 | Haimer et al. |
| 7,062,847 B2 | 6/2006 | Haimer |
| 7,278,194 B2 | 10/2007 | Pfau |
| 2003/0041434 A1* | 3/2003 | Flick .................. B23P 11/027 |
| | | 29/407.05 |
| 2003/0070286 A1* | 4/2003 | Chalmers ............ B23P 11/027 |
| | | 29/800 |

FOREIGN PATENT DOCUMENTS

| | | |
|---|---|---|
| EP | 0830917 A1 | 3/1998 |
| EP | 1310323 A2 | 5/2003 |
| JP | 2003340683 A | 12/2003 |
| WO | 03002298 A1 | 1/2003 |

* cited by examiner

Fig. 8

DEVICE AND METHOD FOR INSERTING A TOOL INTO A TOOL RECEPTACLE

The present invention relates to a device and a method for inserting a tool into a tool receptacle and is directed in particular, although not exclusively, at shrink-fitting devices which shrink to fit a rotating tool into the central receptacle opening of a tool holder or expand to release one therefrom. The invention is also suitable for tool receptacles having elastically deformable chuck elements, for example polygonal or cylindrical chuck sections, as well as for tool receptacles having collet chucks.

The use of shrink-fitting chucks is widespread in machine tools having high rotational speeds or particularly high-precision requirements, in particular drilling, milling, or turning machines, since these machines function with high concentric accuracy and an especially reliable transmission of torque between the tool receptacle and the tool. Tool receptacles of this kind feature a central receptacle opening, the diameter of which is slightly smaller than the outer diameter of the tool being received. In order to insert the tool into the tool receptacle, this opening is heated, for example using an inductive heating device or a heat blower, until the receptacle opening has expanded enough for the tool to be inserted. When the tool receptacle cools—optionally assisted by a cooling device—the tool receptacle shrinks and reliably clamps around the tool on all sides. In order to remove the tool, the tool receptacle is once again heated until the tool can be extracted from the receptacle opening.

One shrink-fitting device of the aforementioned kind is known from EP 1 310 323 A2 and comprises a first holding means for holding the tool receptacle and a second holding means for holding the tool, with the second holding means, including the tool, being able to move towards the first holding means via a threaded rod such that the tool penetrates into the tool receptacle. An optical sensing arrangement, which is able to move in an axial direction along the device, allows a cutting edge of the tool to be sensed in a crosshair. The axial position of the sensing arrangement is measured by means of a measuring arrangement and fed to an electronic control device, which uses an electric motor to control the axial movement of the second holding means such that the tool is able to be fitted into the tool receptacle in a desired axial position.

The device known from EP 1 310 323 A2 is configured for a fully automatic shrink-fitting and unfitting process and features a correspondingly complex design as well as many moving parts. The first holding means is thus designed, for example, in the form of an axially displaceable carriage. The precision of the axial placement of the tool and the tool receptacle is therefore limited by the amount of play and wear of the individual moving components, and it is necessary to inspect the entire length of the unit consisting of the tool and the tool receptacle following shrink-fitting and, in case of a deviation, to correct the placement by expanding, unfitting, and once again shrink-fitting.

In the devices known, further problems arise in the handling of very small tools, for example rotating tools having a diameter less than 10 mm. For example, the use of conventional shrink-fitting procedures places strong loads on and frequently damages tools of this kind. The blades of micro tools having a cutting edge diameter of less than 1 mm down to less than 0.1 mm actually break at the slightest touch. In regard to tools of this kind, there is a general lack of devices and methods in the prior art suitable for inserting such tools into a corresponding tool receptacle.

Against this background, the object of the present invention is to provide a device for inserting a tool into a tool receptacle, said device being of simple design and construction and allowing for very precise axial placement of a tool into the tool receptacle as well as being suitable for handling fragile tools, very small tools in particular. The object of the present invention is to furthermore provide a method for inserting a tool into a tool receptacle, said method enabling precise axial placement of the tool in the tool receptacle at an acceptable operating effort and expense as well as optionally enabling the handling of small and fragile tools.

According to a further aspect of the invention, the specified object is achieved by means of a device for inserting a tool into a tool receptacle, said device comprising a first holding means, which is configured to hold a tool receptacle, a second holding means, which is configured to hold a tool, a linear guide, by means of which the second holding means is able to move in relation to the first holding means in an axial direction running along or parallel to a main axis (X) in order to move the tool closer to the tool receptacle and insert it into the tool receptacle, a sensing arrangement, which is able to move in an axial direction and is configured to sense in a contact-free manner an axial position of a first reference point associated with the first holding means and to sense in a contact-free manner an axial position of a second reference point for a tool held by the second holding means, and a measuring arrangement, which measures an axial displacement path of the sensing arrangement, whereby the sensing arrangement is connected to the second holding means and moves together with it on the linear guide in an axial direction.

As a consequence, a device according to first aspect of the invention senses in a contact-free manner at least two reference points, specifically both on the tool and on the tool receptacle, such that the axial placement of the tool in relation to the tool receptacle can be performed on the basis of both reference points. In contrast to conventional devices, the axial position of the tool is sensed in addition to the device according to the invention being further configured to precisely sense an additional reference point on the first holding means, which supports the tool receptacle. In this way, the actual overall length of the tool assembly being assembled from the tool and the tool receptacle can be scanned during every measurement procedure so that any inaccuracies in the frame or other parts of the device do not as a result of wear or play impair the relative axial placement of the tool and the tool receptacle.

According to a further feature of the first aspect of the invention, the sensing arrangement is connected to the second holding means and moves together with it on the linear guide in an axial direction. As a result, the measuring arrangement, which measures the axial displacement path of the sensing arrangement, is simultaneously able to provide an indication of the actual axial displacement of the tool in relation to the tool receptacle.

An optical sensing arrangement, for example a camera linked with an image processing device having a display device, can be used for sensing the first and the second reference points in a contact-free manner. It is alternatively possible to use a transmitted light method or ultrasound waves for sensing in a contact-free manner. This contact-free sensing avoids mechanical stress on the tool, thus allowing small or fragile tools to be handled without the risk of damage. The second reference point is preferably selected in the area of a blade, for example the first cutting edge in an axial direction (facing away from the tool receptacle) since this is also the corresponding reference point for determining an overall length of the tool assembly comprising the tool and the tool receptacle. By means of the contact-free sensing, the reference point is able to be quite precisely defined without contacting and thus damaging the blade.

The second holding means, which is configured to hold the tool, can preferably comprise a base section, which is supported by and able to move in an axial direction on the linear guide, and a carriage, which is supported by and able to move in an axial direction on the base section, whereby the carriage features retaining means for retaining a tool. By means of adjusting the axial position of the carriage, a precise position of the tool held on the carriage can thus be adjusted in relation to the base section of the second holding means and the tool positioned in relation to the sensing arrangement. If, in particular, the sensing arrangement is connected to the base section, then the axial position of the tool can by means of adjusting the carriage be set such that the sensing arrangement exactly measures the second reference point of the tool. For example, the sensing arrangement can feature a target area such as a crosshair or the like overlying the tool, with an operator being able to adjust the carriage in an axial direction such that a cutting edge or other reference point of the tool discernible in the image lies exactly in the target area.

In order to set the axial position of the carriage in relation to the base section, a threaded rod having a gripping section manually rotatable by the operator, a linear guide driven by an electric motor, or the like can be used.

In a further preferential embodiment of the invention, the device features a stop, which is adjustable in an axial direction and is able to be fixed at each of various axial positions, whereby the stop is configured to limit an axial movement of the second holding means along the linear guide. By means of the stop, a specific axial position of the second holding means is able to be marked and precisely stopped at again. In this way, for example, an axial displacement path corresponding to a desired overall length for the tool assembly comprising the tool and the tool receptacle can be measured by the sensing arrangement being moved from the first reference point as far as the corresponding displacement path and the stop being fixed at this location. A tool can subsequently be inserted into the second holding means and, after the tool receptacle has been opened, the second holding means having the tool can be moved until reaching the stop at the first holding means in order to insert the tool at the desired axial position into the tool receptacle.

In a further embodiment of the present invention, it is provided that the first holding means comprises: a frame element, a chucking device which is able to be mounted on the frame element and features a first coupling means for coupling with a tool receptacle, and a calibration member which is able to be mounted on the frame element instead of the chucking device, whereby the first reference point is provided on an edge or surface of the calibration member that is able to be sensed in a contact-free manner. The chucking device can at the same time be part of a machine tool within which the complete tool assembly comprising the tool receptacle and the tool is to be clamped in order to use the tool to carry out the desired processing of a workpiece.

The machine tool can, for example, be a drilling machine or a turning machine. The frame element of the first holding means can comprise a chucking device of this kind as an interchangeable part, or a chucking device that has been adapted specifically for the device according to the invention and features corresponding coupling means for coupling with the tool receptacle can be used. According to the embodiment of the invention described above, it is also possible to mount a calibration member on the frame element instead of the chucking device, said calibration member being designed such that a predetermined first reference point of the calibration member (a forward edge or surface of the calibration member, for example) corresponds exactly to the axial position of a predetermined reference point of the chucking device (such as a forward edge or surface). The advantage of using a calibration member instead of the chucking device itself is that the shape of the calibration member in the area of the reference point can be specifically designed for the precise sensing of this reference point and can, for example, feature a precisely designed edge or surface for this purpose able to be effectively sensed by means of the contact-free sensing method.

The axial length of the calibration member can be equal to the axial length of the chucking device, and the first reference point can be provided on an end of the calibration member facing away from the frame member and can be formed, for example, by an edge or a rounded area. When making an optical measurement by means of a camera or the like in particular, this approach enables precise sensing of the reference point since a forward edge or rounded area provides a good focus and contrasts well with the background.

According to a second aspect of the present invention, the aforementioned object of the invention is achieved by means of a device for inserting a tool into a tool receptacle, said device comprising: a first holding means, which is configured to hold a tool receptacle, a second holding means, which is configured to hold a tool, a linear guide, by means of which the second holding means is able to move in relation to the first holding means in an axial direction along or parallel to a main axis (X) in order to move the tool closer to the tool receptacle and insert it into the tool receptacle, whereby the second holding means features a clamping arrangement having at least one first engaging element and one second engaging element, whereby the engaging elements are arranged to be able to move with respect to one another in order to hold a tool in clamping engagement between them at a setpoint position or to release it, whereby the second holding means features a spring arrangement, by means of which one of the engaging elements is able to move elastically in a direction orthogonal to the main axis (X).

According to an important feature of the second aspect of the invention, a clamping arrangement having at least two engaging elements for holding the tool in clamping engagement is provided, whereby the engaging elements are able to move elastically by means of a spring arrangement. The inventors have found that using the elasticity of a spring to support the tool in the second holding means drastically reduces the risk of damaging or breaking the tool during handling, particularly during insertion into the tool receptacle. Especially when using very small tools having shaft diameters of less than 10 mm, in particular 3 mm or less, and/or blade diameters of less than 1 mm or even less than 0.1 mm, it was previously almost impossible to insert the tool into the tool receptacle without damaging or breaking it, or it was only possible if the axial position of the tool coincidentally or as the result of great technical effort exactly coincided with the axial position of the receptacle opening of the tool receptacle. Using the elasticity of a spring to support the tool in accordance with the second aspect of the invention allows small positional inaccuracies between the tool axis and the tool receptacle axis to be compensated for in a dynamic manner. In case an axial deviation of this kind occurs, insertion of the tool into the tool receptacle does not then result in bending stress on the tool, so the tool will not be damaged or break. Instead, the tool axis dynamically aligns with the tool receptacle axis by means of movement of the spring arrangement. In this way, even the smallest tools and micro tools having a blade diameter of less than 1 mm or even less than 0.1 mm can be inserted into tool receptacles without damage.

In an embodiment of the second aspect of the invention, the second holding means can feature a base section, which is supported by and able to move in an axial direction on a linear guide, and a carrying section, which carries the clamping arrangement, whereby the spring arrangement can be arranged between the clamping arrangement and the carrying section such that the clamping arrangement uses the elasticity of a spring to move within a dynamic range in relation to the carrying section. In this way, the clamping arrangement as a whole is elastically supported such that the movable engaging elements are able to be movably supported on the clamping arrangement using a straightforward mechanical structure. A spring arrangement, which is arranged between the clamping arrangement and the carrying section, can feature a simple design and can, for example, be implemented by means of leaf spring arrangements. The spring arrangement can be configured such that an elastic movement is accomplished in at least one direction orthogonal to the axial direction. The spring arrangement preferably enables an elastic movement in at least two directions orthogonal to the axial direction, in particular in at least two directions running orthogonal with respect to one another.

In order to hold a tool on the second holding means precisely and without damage, the clamping arrangement can feature a central axis, which runs in an axial direction through a mid-point between the two engaging elements and coincides with the central axis of the tool when the tool has been been clamped, whereby the engaging elements are by way of the clamping arrangement able to move in a uniform manner towards or away from one another in a radial direction. The position of the central axis of the tool therefore depends upon the size of the tool.

The two engaging elements are able to be moved between the engaging position and the clamping position by means of a pneumatic, hydraulic, or an electric drive means, thus enabling the clamping force to be precisely adjusted and, as a result, also enabling the protection of even particularly small and fragile tools from damage due to excessive clamping force. As an alternative, it is also conceivable to move the engaging elements manually, for example resisting the force of a spring.

Preferably, the engaging elements each feature contact sections, which are configured to enter into clamping contact with a tool being held in clamping engagement, whereby the contact sections are each formed by the walls of an axial groove, preferably an axial groove having a V-shaped cross-section. By means of axial grooves, an elongated rotary tool in particular can be held in the proper alignment and orientation so that it is only necessary to adjust the axial position of the tool. The further advantage of V-shaped grooves is that tools having a round cross-section only make contact along a line, so shavings or contamination on the tool normally do not impede proper placement of the tool. V-shaped grooves furthermore make it possible to hold tools having a variety of diameters without changing the engaging elements.

In addition, a device according to the second aspect of the invention can preferably feature a sensing arrangement, which is able to move in an axial direction and is configured to sense in a contact-free manner an axial position of a reference point associated with the first holding means and/or sense in a contact-free manner an axial position of a second reference point for a tool held by the second holding means such that the tool is able to be positioned in a proper manner. In addition, the device can in particular comprise a measuring arrangement, which measures an axial displacement path of the sensing arrangement.

Moreover, further features of the device according to the first aspect of the invention may also be used in a device according to the second aspect of the invention in order to combine the advantages of both aspects of the invention.

The advantages of the devices according to the first aspect of the invention or the second aspect of the invention are especially applicable if the tool is a rotary tool and the tool receptacle is a tool chuck for accepting the rotary tool. The precision of the axial position of the tool in relation to the tool receptacle plays a particularly important role for rotary tools, and there is a growing demand for the use of particularly small tools and micro tools. It is in particular envisaged that the device according to the first aspect or the second aspect of the invention is a shrink-fitting device, and that a heating means for heating a tool receptacle being held on the first holding means is preferably provided for this purpose. Depending on the embodiment, the device can furthermore comprise a cooling means for cooling the tool receptacle in order to accelerate the shrink-fitting process.

Advantageously, the cooling means for cooling the tool receptacle can be integrated into the housing for the heating means for easier operation during reconfiguration of the device between the heating and the cooling of the tool receptacle. In particular, the cooling means can be configured to, following the heating process, cool the tool receptacle being held on the first holding means by way of spraying a cryogenic fluid, in particular $CO_2$. It has been determined that a particularly high level of cooling efficiency along with easy operation can be achieved using $CO_2$. In order for the tool receptacle to be cooled in a particularly uniform manner, the cooling means can preferably feature three or more outlet openings for $CO_2$ which are oriented towards the tool receptacle.

In an advantageous variation of the first or the second aspect of the invention, it is furthermore provided that the second holding means comprises: a base section, which is supported by and able to move in an axial direction on the linear guide, a cantilever section, which is supported by and able to move in an axial direction with respect to the base section, said cantilever section preferably carrying a component of the sensing arrangement, for example an illumination means, and a cantilever spring arrangement, which biases the cantilever section in an axial direction towards the base section and towards the first holding means, whereby the base section features a stop, which limits the axial movement of the cantilever section. This kind of design functions such that part of the second holding means, for example the illumination means of the sensing arrangement, is held in an exact position on the base section by means of the cantilever spring arrangement, and it moves along with the base section when the second holding means nears the first holding means. However, when the two holding means come into close proximity as the tool is being inserted into the tool receptacle, the cantilever section can strike part of the device associated with the holding means (for example a heating means attached to the tool receptacle) and, as a result, be able to lift up from the stop on the base section. The base section, and therefore the tool as well, can then move further towards the first holding means until the tool is entirely inserted into the tool receptacle while the cantilever section remains behind.

Given the fact that, when the second holding means and the first holding means come into close proximity, the cantilever section is lifting up from the stop on the base section against the force of the cantilever spring arrangement, the cantilever spring arrangement can simultaneously serve a useful purpose in removing the tool from the tool receptacle: The force of the cantilever spring arrangement is then acting between the tool and the tool receptacle. As soon as the tool receptacle opens (for example when the tool receptacle is heated in the case of a shrink-fitting device) the cantilever spring arrangement will automatically pull the tool out of the tool receptacle. It should be understood that this function is also able to be performed using a separate spring arrangement independent of any movable cantilever arrangement.

According to a third aspect of the present invention, the aforementioned object of the invention is achieved by means of a method for inserting a tool into a tool receptacle, said method comprising the following steps:
  a. providing the tool receptacle and the tool at an axial distance from one another,
  b. sensing in a contact-free manner the axial position of a first reference point associated with the tool receptacle,
  c. sensing in a contact-free manner the axial position of a second reference point associated with the tool,
  d. opening the tool receptacle,
  e. inserting the tool into the tool receptacle such that the distance between the first reference point and the second reference point assumes a predetermined setpoint value,
  f. closing the tool receptacle.

Using a method according to the third aspect of the invention achieves the outcomes and advantages described in connection with the first aspect which are based upon not only sensing the axial position of the tool, but rather also determining two reference points in a contact-free manner—a first reference point associated with the tool receptacle and a second reference point associated with the tool. According to an important feature of the method according to the third aspect of the invention, the axial placement taking place between the tool and the tool receptacle is based upon a distance between the first reference point and the second reference point. In particular, the tool is inserted into the tool receptacle until the distance between the reference points assumes a predetermined setpoint. Only then will the tool receptacle be closed.

In other words, the method according to the third aspect of the invention and the device according to the first aspect of the invention can be used equally well to measure an overall length of a tool assembly comprising a tool receptacle and a tool even before the tool receptacle is closed. Both of the reference points crucial in measuring this length are precisely sensed during every shrinking process such that positional inaccuracies in other parts of the device resulting from play, wear, or the like do not impair precision.

In a preferential embodiment of the method according to the third aspect of the invention, it is proposed that a device be used which comprises: a first holding means, which is configured to hold a second holding means, which is configured to hold a tool, a linear guide, by means of which the second holding means is axially movable in relation to the first holding means in order for the tool to move closer to the tool receptacle and be inserted into the tool receptacle, a sensing arrangement, which is axially movable and which is configured to sense in a contact-free manner an axial position of a first reference point associated with the first holding means and to sense in a contact-free manner an axial position of a second reference point for a tool held by the second holding means, and a measuring arrangement, which measures an axial displacement path of the sensing arrangement, whereby the method comprises the following steps:
  a. sensing in a contact-free manner the axial position of the first reference point,
  b. moving the sensing arrangement in an axial direction into a position where the sensing arrangement is located at the desired distance from the first reference point;
  c. setting a positioning means according to the axial position of the measuring arrangement,
  d. inserting the tool into the second holding means,
  e. sensing in a contact-free manner the axial position of the second reference point for the tool held by the second holding means,
  f. opening the tool receptacle,
  g. moving the second holding means and the first holding means together such that the tool penetrates into the tool receptacle,
  h. the movement together being stopped by the positioning means,
  i. closing the tool receptacle,
  j. releasing the tool from the second holding means The foregoing method makes it possible to sense and mark the first and the second reference points using straightforward work steps, as well as to quickly insert a tool into a tool receptacle using the reliable and precise axial placement of both components in order to form a tool assembly having a predetermined setpoint length. In the case of shrink-fit chucking in particular, there is a relatively short timeframe for inserting the tool following the heating process and the resulting expansion of the chuck bore, so it is advantageous to insert the tool into the chuck bore quickly.

Although the present invention is preferably intended to facilitate manual insertion of a tool into a tool receptacle, the device described is also suitable for integration into fully automated processes. It is thus possible to configure relatively straightforward and independent positions for transferring from or to external devices such as the gripper arm of a robot since the exact position of the tool is sensed anew for each chucking process. It is not necessary for the tool transfer to be a high-precision and thus technically elaborate process. For example, one potential design for such a fully automated process is described in DE 202015006540 U1.

Accordingly, the entire method for inserting a tool into a tool receptacle can be process-controlled such that all steps take place automatically.

The preferential use of an optical sensing arrangement furthermore makes a pictorial representation of the tool on a monitor possible. The image from the camera can in this case also be enlarged on a monitor so that the operator can to use the camera image to examine the tool being used for damaged areas which would be invisible to the naked eye.

It may be furthermore provided that the tool receptacle is able to perform rotational movements within the chucking device. As a result, the tool receptacle is able to be turned inside of the chucking device. If the sensing arrangement is properly positioned, then the chucked tool can then be observed and optionally measured from all sides.

The invention is explained in more detail hereinafter by way of preferential embodiments and in reference to the attached drawings. Shown are.

Figure 1:
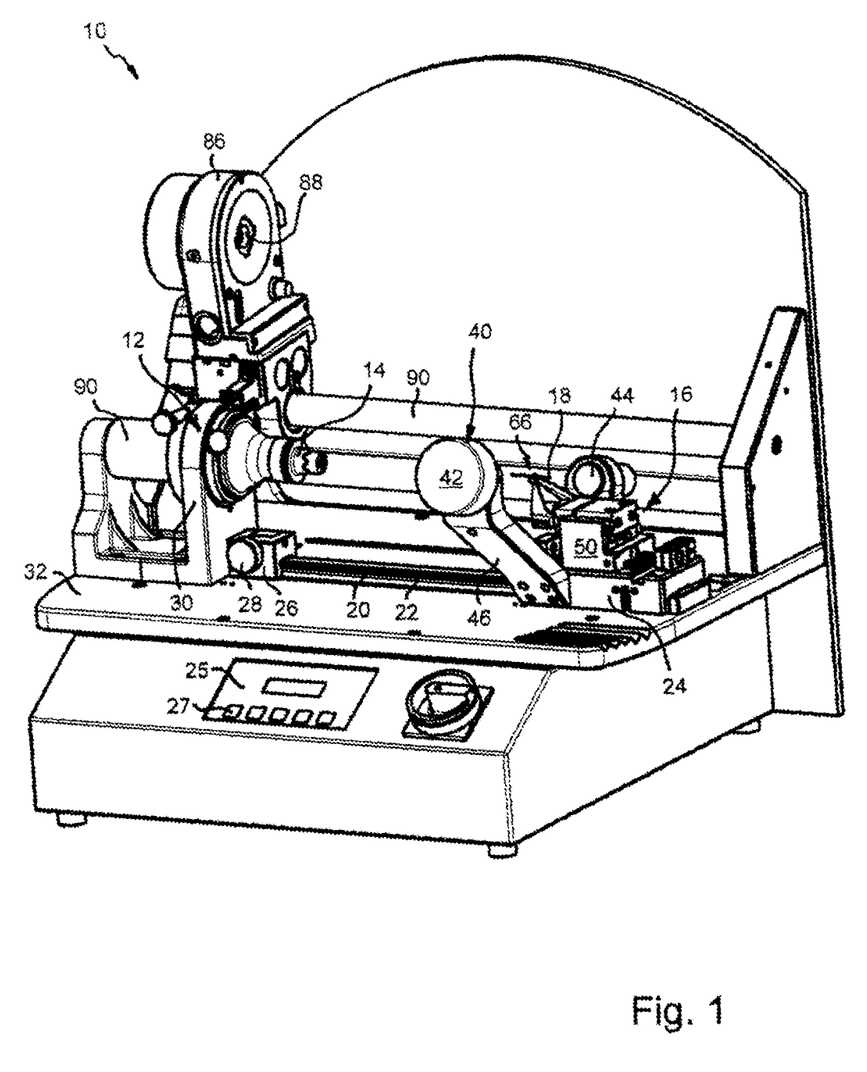
FIG. 1: a perspective view of a device for inserting a tool into a tool receptacle according to a first embodiment of the present invention.
Figure 2A:
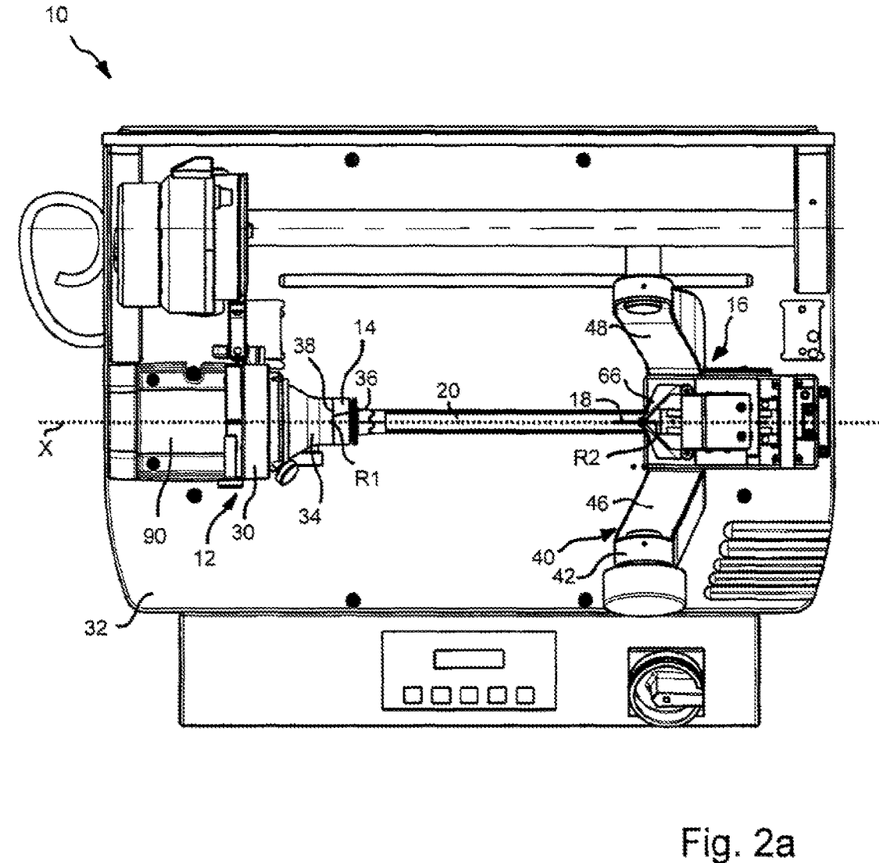
FIG. 2a: a plan view from above of the device according to the first embodiment.
Figure 2B:
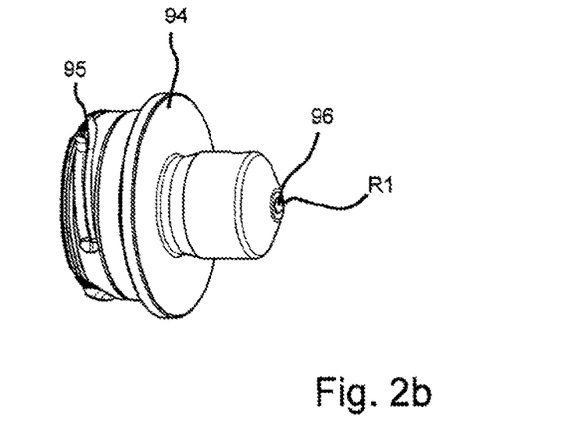
FIG. 2b: a perspective view of a calibration member according to the first embodiment of the device.

In FIGS. 1 and 2, a device for inserting a tool into a tool receptacle according to the first embodiment of the present invention is generally designated by reference sign 10 and comprises a first holding means 12, into which a tool receptacle 14 is inserted, as well as a second holding means 16, which holds a tool 18. A main axis (X) of the device 10 runs through the centres of the tool receptacle 14 and the tool 18. In the embodiment now being described, the device 10 is a shrink-fitting device for thermally shrink-fitting and unfitting a rotating tool, for example a drill, in a tool receptacle, the receptacle opening of which can be expanded by means of heating in order to receive or release the tool. However, the principles of the present invention are equally applicable to tool receptacles which are, for example, adjustable by means of compressive force, by means of a threaded mechanism, or by some other means.

The device 10 furthermore comprises a linear guide 20, by way of which the second holding means 16 is axially movable in relation to the first holding means along or parallel to the main axis X. In the context of this publication, directions which run along or parallel to the main axis X are referred to as axial directions. The linear guide 20 can, for example, be implemented by means of a track 22, upon which a base section 24 of the second holding means 16 is supported and linearly displaceable. A measuring arrangement, which preferably functions electronically, senses the axial position of the second holding means 16 along the linear guide 20, for example by means of inductive scanning, and shows a measured axial displacement path or a measured axial position to the user on a display on the control panel 25 of the measuring arrangement.

In the embodiments, the main axis runs in a horizontal direction. It should be understood that it may run at an incline or even vertically.

The movement of the second holding means 16 in an axial direction can be limited by means of a stop 26, which can be positioned and fixed at various positions. The stop 26 can in particular also be displaceably guided on the track 22 of the linear guide 20 and feature a set screw 28 for fixing the stop in an axial position.

The first holding means 12 preferably comprises a frame element 30, which is rigidly connected to a main body 32, for example a housing, a table, or some other frame structure of the device 10. The first holding means further preferably features a chucking device 34, which is mounted on the frame element 30 and which corresponds to a chucking device like the one present in the corresponding tooling machine, in which the device 10 prepares the tool and the tool receptacle. An axial end of the chucking device 34 facing away from the frame element 30 features coupling means, for example appropriate threaded means, for coupling with the tool receptacle 14. A side of a resting surface 36 of the chucking device 34 facing away from the frame element 30 is configured to come into resting contact with a radial resting surface 38 of the tool receptacle 14 when the tool receptacle 14 is properly coupled with the chucking device 34. As a result, the axial position of the resting surface 36 of the chucking device 34 is equal to the axial position of the radial resting surface 38 of the tool receptacle 14, so the axial position of the resting surface 36 of the chucking device 34 represents a suitable benchmark for precisely determining the relative position between the tool receptacle 14 and the tool 18. In the context of the invention, the resting surfaces 36, 38 (more precisely, the axial positions thereof along the main axis X) define the first reference point R1.

The device 10 furthermore comprises a sensing arrangement 40 for sensing in a contact-free manner the reference points for the holding means, or rather for the tool or the tool receptacle. The sensing arrangement 40 can feature a camera 42, which is oriented towards the main axis X. An illumination means 44, which illuminates the object being sensed, is mounted on a side of a camera 42 diametrically opposite of the main axis X. In this way, for example, a forward edge or blade of a tool throws a sharply bordered silhouette that is able to be precisely captured in the camera image (transmitted light method). Preferably, a magnification of the image from the camera 42 is displayed on the monitor (also not depicted) such that the operator has it in view while setting and adjusting the device. Alternatively, other contact-free sensing devices are also conceivable, for example an optical projector.

The sensing arrangement 40 is connected to and moves together with the second holding means 16. Thus, an arm 46, which holds the camera 42 at a radial distance from the main axis X, can in the embodiment be connected to the base section 24 of the second holding means 16 or have an integral design. In the embodiment depicted, a second arm 48, which holds the illumination means 44 at a distance from the main axis X and diametrically with respect to the camera 42, is also connected to the base section 24.

Figure 3:
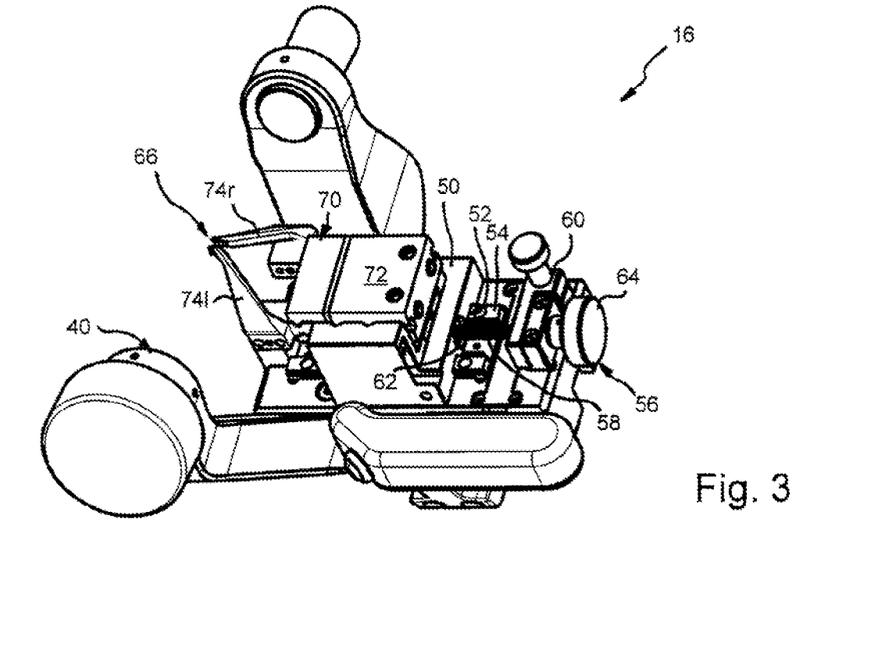
FIG. 3: a perspective view of a second holding means according to the first embodiment of the device.
Figure 4:
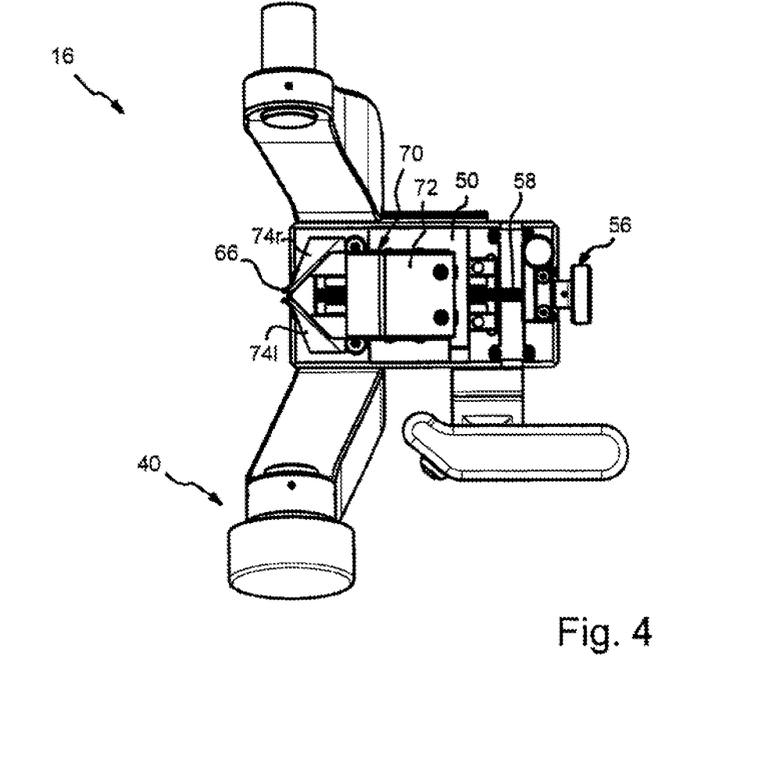
FIG. 4: a plan view from above of the second holding means according to the first embodiment.
Figure 5A:
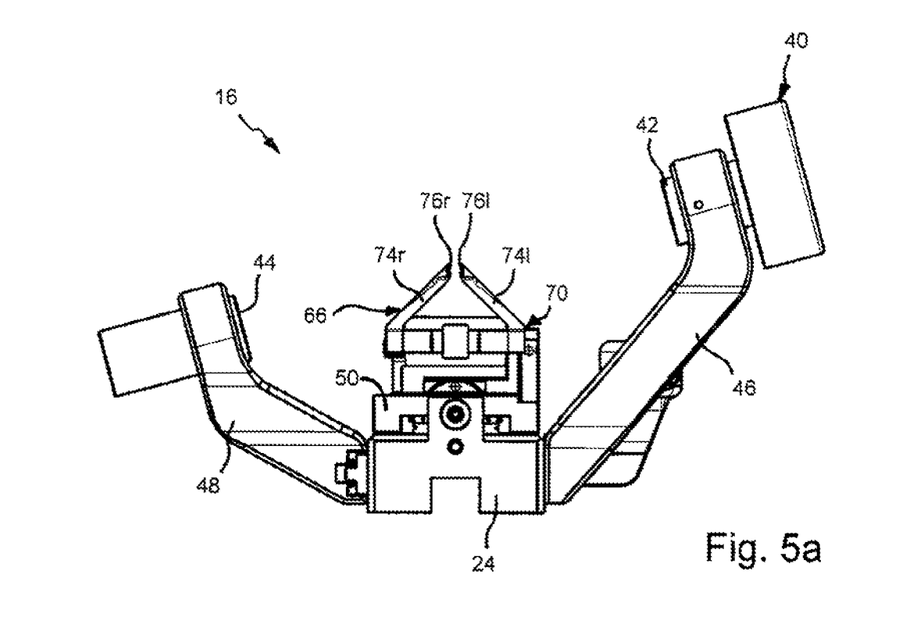
FIG. 5a: an axial view of the second holding means according to the first embodiment as seen looking from the first holding means towards the second holding means.
Figure 5B:
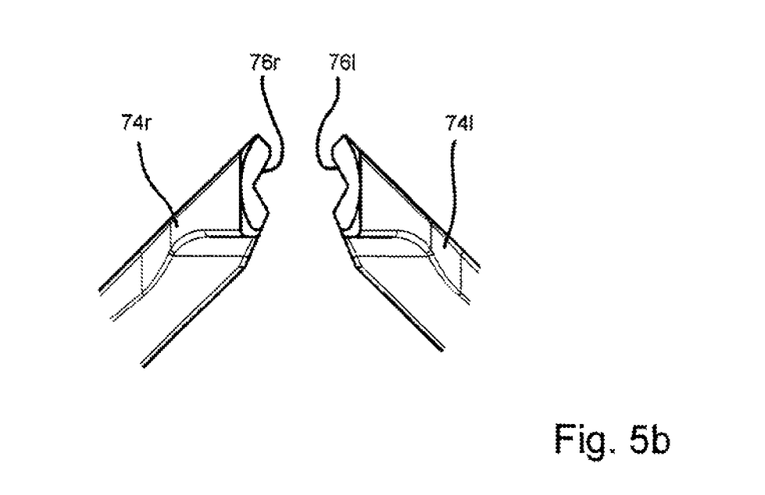
FIG. 5b: an enlargement of a detail from FIG. 5a in the area of the two engaging elements.

Additional features of the second holding means 16 are described in greater detail hereinafter in further reference to FIGS. 3 to 5. Supported on the base section 24 of the second holding means 16 in the second embodiment is a carriage 50, which is displaceable in an axial direction in relation to the base section by means of a linear guide 52, which is implemented by means of tracks 54 and corresponding grooves running in an axial direction. A setting means 56 can also be provided in order to move the carriage in an axial direction and to allow the operator to set the axial position of the carriage 50 in relation to the base section 24. Provided for this purpose in the embodiment depicted is a threaded rod 58, which is rotatably supported on a supporting element 60 of the base section but is not axially displaceable, and which engages with a corresponding axial inner thread 62 of the carriage 50. Manual rotation of an adjusting wheel 64 for the threaded rod 58 (or, alternatively, an actuator driven by an electric motor) then causes the carriage 50 to move in an axial direction.

Retaining means 66 for retaining a tool 18 (only depicted in FIGS. 1 and 2) are mounted on the carriage 50, and an advantageous design for the retaining means 66 is described in more detail hereinafter. Axial adjustment of the carriage 50 causes the retaining means 66 and, therefore, also the tool 18 being held thereupon to move in an axial direction relative to the base section 24, hence also relative to the sensing arrangement 40, such that the tool 18 is able to reach a predetermined setpoint position, which can be precisely sensed by means of the sensing arrangement 40. Therefore, the sensing arrangement can feature a target area, for example a crosshair or another kind of marking, in the camera image. A suitable reference point R2, for example a forward cutting edge of a cutting tool or the like which is visually discernible in the camera image, can then be made to precisely coincide in an axial direction with the target area. In the context of the present invention, if the tool 18 is correctly positioned in relation to the sensing arrangement 40 by means of displacing the slide 50, then the sensing arrangement 40 will sense the second reference point R2.

A preferential variation of the retaining means 66 according to the embodiment depicted is described in greater detail hereinafter in reference to FIGS. 3 to 6. In this variation, the retaining means 66 comprise a clamping arrangement 70 having one control member 72 mounted on the carriage 50 as well as two engaging elements 74*l* and 74*r* movably supported on the control member. The free ends of the engaging elements 74*l*, 74*r* facing away from the control member 72 feature clamping sections 76*l*, 76*r*, each of which is formed by a preferably V-shaped groove running in an axial direction. The groove openings of the clamping sections 76*l*, 76*r* face towards each other so as to together form a receptacle for, in particular, a cylindrical tool 18. An axial overall length of both clamping sections 76*l*, 76*r* preferably measures less than approximately 20 mm and preferably less than approximately 10 mm so that the shaft of a rotating tool can be gripped without the fragile blades of the tool being touched, whereas enough of the shaft length remains at the same free of the clamping sections that the tool can be inserted sufficiently into the tool receptacle 14.

The engaging elements 74*l*, 74*r* are movably supported on the control member 72 in such a way that they are able to move towards or away from one another in a uniform manner, with the clamping sections 76*l*, 76*r* thereby moving diametrically (with respect to the main axis X) closer to or farther away from the main axis X. The tool 18 can as a result be clamped in at the proper axial orientation. The adjustment of the engaging elements 74*l*, 74*r* can take place by means of a pneumatic drive integrated into the control member 72. The process of opening or closing the engaging elements 74*l*, 74*r* can be controlled via compressed air feed or discharge lines (not depicted).

Figure 6:
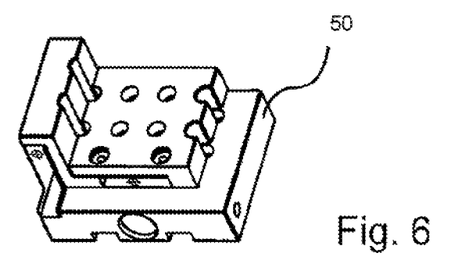
FIG. 6: a perspective view of a carriage supported on the second holding means according to a first embodiment of the invention.
Figure 7A:
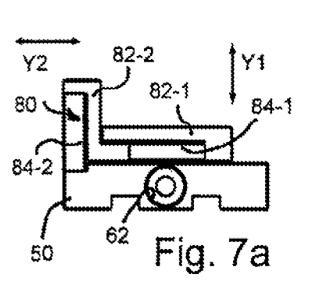
FIGS. 7a to 7e: Views in a radial direction showing the carriage from above, from the left, from below, and from the right, respectively.
Figure 7B:
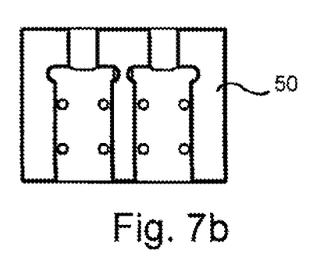
Figure 7C:
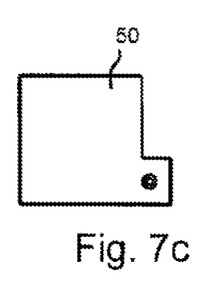
Figure 7D:
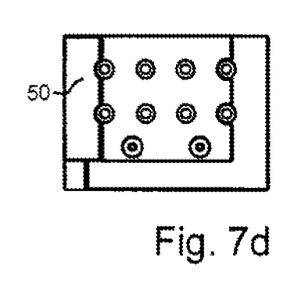
Figure 7E:
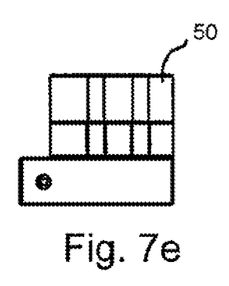

According to a further preferable feature of the invention, the clamping arrangement 70, and the control member 72 in particular, is not rigidly mounted on the carriage 50, but is rather supported on the carriage 50 via a spring arrangement 80 such that the clamping arrangement 70 and, therefore, the tool 18 being retained on the retaining means 66 is able to move elastically in at least a direction orthogonal to the main direction X. The carriage 50 features for this purpose a first carrier element 82-1, which is elastically supported on the carriage 50 via a first spring portion 84-1 such that the first carrier element 82-1 is able to move elastically in a first radial direction Y1 relative to the carriage 50. The carriage 50 can furthermore feature a second carrier element 82-2, which is elastically supported on the carriage 50 via a second spring portion 84-2 such that it is able to move elastically with respect to the carriage 50 along a second radial direction Y2, which is preferably orthogonal to the first spring direction Y1. The spring portions 84-1 and 84-2 can each be in the form of leaf springs, in particular steel tongues. Preferably, parallelogram guides are inserted for every spring portion 84-1, 84-2, each of which is made of two leaf springs, in particular thin-walled steel tongues.

The control member 72 of the clamping arrangement 70, or another mounting element of the retaining means 66, is secured to the first carrier element 82-1 or the second carrier element 82-2 via suitable mounting means, for example screw holes. As a result, the clamping arrangement 70 or the retaining means 66 corresponding to the spring paths and spring directions Y1, Y2 are elastically supported in a direction orthogonal to the axial direction. By means of choosing appropriate spring elements, for example leaf springs, it is furthermore possible to eliminate spring movement in an axial direction as much as possible so that the sensing arrangement 40 does not to impair the precision with which the second reference point R2 is sensed.

A method for inserting a tool 18 into a tool receptacle 14 according to an embodiment of the invention is described in greater detail in reference to the drawings.

The desired result of the method is the shrink-fitting of a tool 18 in the tool receptacle 14, whereby the tool is positioned in the tool receptacle in such a way that an overall length of the complete assembly comprising the tool 18 and the tool receptacle 14 has a predetermined setpoint length. The setpoint length is determined in this case by the distance between a reference point on the tool side and a reference point on the tool receptacle side. In the embodiment, a forward edge of a blade which can easily be optically sensed by the sensing arrangement 40 is used as a reference point R2 on the tool side.

The radial resting surface 38 of the tool receptacle 14, hence the front side of the tool receptacle facing away from the tool 18, serves as the reference point R1 on the tool receptacle 14 side. The sensing arrangement 40 would be able to scan the resting surface 36 of the chucking device 34 in order to determine the first reference point R1. However, this surface is normally not designed for precise calibration and/or sufficiently precise optical sensing. For this reason, the present embodiment of the method according to the invention proposes that the chucking device 34 first be disassembled from the frame element 30 and a calibration member 94 installed on the frame element 30 instead (see FIG. 2*b*). The calibration member 94 features a mounting means 95 for mounting on the frame element and, in a mounted condition, has the same axial length as the chucking device 34. However, a forward edge or surface of the calibration member 94 facing away from the frame element 30 provides a very precise edge or rounded area well-suited for optical sensing. Coming into consideration in this case is, for example, a sphere 96, the rounded area of which provides a sharp optical image in contrast to the background when seen from an axial zenith. This edge or rounded area at the axial end of the calibration member 96 is then located precisely at the first reference point R1, hence at the same axial position as the resting surface 36 of the chucking device 34, or rather the radial resting surface 38 of the tool receptacle 14.

Following assembly of the calibration member, the second holding means 16, into which no tool 18 has yet been inserted, is moved along the linear guide 20 on the first holding means 12 until the sensing arrangement 40 senses the first reference point R1. The axial position of the second holding means 16 is precisely set such that the first reference point R1 of the calibration member is, for example, located exactly in a target area of the camera image made by the camera 42. This position activates a marking function, for example a zero position for the measuring arrangement, on the control panel 25 of the measuring arrangement. A zero key 27 on the control panel 25 can be pressed for this purpose.

The second holding means 16 can then be moved back away from the first holding means 12, the calibration member disassembled, and the chucking device 34 and the tool receptacle 14 installed instead.

Thereafter, the holding means 16 can be moved along the linear guide 20 into a position where the display on the measuring arrangement control panel 25 indicates the desired distance between the first reference point R1 and the second reference point R2, hence the desired overall length of the assembly comprising the tool receptacle and the tool. In this axial position, the stop 26 is then brought into resting contact with the second holding means 16 and fixed against axial movement. Thereafter, the second holding means 16 can be moved farther away from the first holding means 12 until sufficient distance is provided in order to easily insert the tool 18 into the retaining means 66. The clamping arrangement 70 can, for example, be used for this purpose so that the engaging elements 74l, 74r are located at a sufficient distance from one another to enable insertion into the tool 18. In addition, the tool can easily be held on the shaft side to avoid touching the blades. The tool 18 is preferably positioned in an axial direction such that the clamping sections 76l, 76r grip the tool on an end of the shaft section facing the blades, hence in a central area of the tool 18. Thereafter, the clamping arrangement 70 can be actuated in order to close the retaining means 66 such that the engaging elements 74l, 74r move towards one another and the tool 18 is clamped between the clamping sections 76l, 76r.

In a next method step, the carriage 50 is by way of actuating the setting means 56 displaced in an axial direction relative to the base section 24 such that a section of the tool 18 acting as the second reference point R2, in particular a forward edge of a blade, arrives at a target area of the sensing arrangement 40. In particular, the axial position of the tool 18 is able to be set precisely such that the reference point R2 on the tool side is located precisely within a target area overlying the camera image made by the camera 42. If this setting is activated, a display on the measuring arrangement control panel 25 then shows the exact distance between the first reference point R1 and the second reference point R2.

In a following method step, the tool receptacle 14 is opened. In the preferential case of a shrink-fitting device, provided for this purpose is a heating means 86, which features, for example, ring-shaped inductive heating, the receiving opening 88 for which is able to be placed to fit coaxially on top of the tool receptacle 14. In the embodiment depicted, the heating means 86 is able to move in an axial direction on a track 90 and is able to pivot around the track 90 in such a way that it can be pivoted as selected into an active position and an inactive position. In the active position, the opening 88 of the heating means 86 is coaxial to the main axis X. In the inactive position, the heating means 86 is pivoted in a radial direction away from the main axis X, thus making room for the aforementioned calibration steps or for subsequent cooling steps.

After the tool receptacle 14 has been heated to the desired temperature, the second holding means 16 can be moved along the linear guide 20 towards the first holding means 12 until the shaft side of the tool 18 enters the tool receptacle 14. The second holding means 16 is thereby moved as far as the fixed stop 26 at the first holding means 12. The distance between the first reference point R1 and the second reference point R2 corresponds exactly to the desired length of the tool assembly.

During the penetration of the the tool 18 into the tool receptacle 14, any slight differences potentially present between the axis of the tool 18 and the axis of the receptacle opening of the tool receptacle 14 can be compensated for by the retaining means 66 being able to move dynamically within the range of motion of the spring arrangement 80 such that that excessive stress on the tool 18 is able to be avoided.

In a subsequent method step, the tool receptacle 14 is closed. In the case of a shrink-fitting device, this takes place by means of cooling the tool receptacle 14. In principle, the heating means 86 could be switched off or removed for this purpose. However, it is preferable to also attach a cooling device (not shown) to the tool receptacle in order to shorten the duration of the shrink-fitting process. Liquid $CO_2$ can preferably be used in the cooling device. In a particularly preferential embodiment, the heating means 86 can also be used as a cooling means by feeding a cooling agent such as liquid $CO_2$ directly through the heating means 86 after the heating means, in particular the induction coil, has been switched off, thus cooling the tool receptacle 14. For example, nozzles can be provided in the heating means 86 which are integrated into the induction coil and through which liquid $CO_2$ is sprayed onto the tool receptacle 14. The advantage of a combined heating and cooling unit of this kind is that the hot tool receptacle 14 is always protected from unintended contact due to an operator, and that a work step for removing the heating means 86 and moving a cooling means into place can be omitted. Moreover, the cooling procedure can in this way be quickly initiated and the process times further reduced. Other cooling processes are also conceivable, for example air cooling or cooling by means of applying a water-cooled heat sink.

After the tool receptacle 14 has been closed, the retaining means 66 are opened in order to release the tool 18. In particular, the control member 72 can additionally be controlled to move the engaging elements 74l, 74r apart from one another. As a result, the tool assembly comprising the tool receptacle and the tool is then completely assembled and has the desired overall length.

Subsequent quality control steps can, if desired, check various parameters of the assembled tool assembly such as the overall length, the concentricity, or the diameter of the tool. In particular, the tool assembly can for this purpose remain assembled in the chucking device 34, and the sensing arrangement 40 can be moved again in an axial direction to sense the first reference point R1 and/or the second reference point R2 and verify the overall length of the tool.

In a further design variation of the invention, the chucking device can be rotatable and driven to rotate manually or by means of a motor arrangement. The sensing arrangement 40 can sense the rotating tool 18 in a contact-free manner, in particular sensing an optical image of the rotating tool. In this way, any radial runout by the tool can be sensed and in particular tracked on the monitor so that the concentricity of the tool 18 is verifiable.

The sensing of a rotating tool 18 in the design variation described furthermore provides the option of verifying the diameter of the tool. This can in particular be advantageous in drilling tools or milling tools in which measurement of the effective diameter using a straightforward, non-rotating view of the tool is made difficult as a result of the flutes and the frequently asymmetric distribution of blades. In contrast, rotating the tool and sensing the tool image by means of the sensing arrangement 40, in particular the camera 42, enables an effective tool diameter to be determined in a very precise manner.

Figure 8:
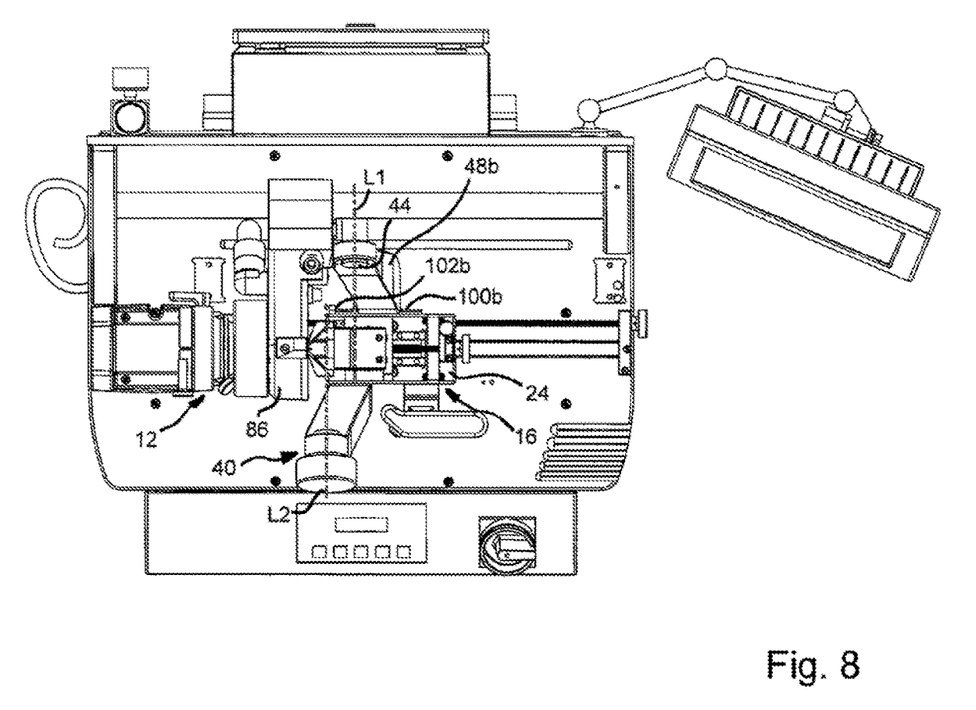
FIG. 8: a plan view of a device according to a second embodiment of the invention.

A second embodiment of the invention is described hereinafter in reference to FIG. 8. The second exemplary embodiment is a modification of the first embodiment and differs from the first embodiment only with respect to the configuration of the second arm of the sensing arrangement, so reference is explicitly made to the description of the first embodiment as regards all of the other features.

In the second embodiment, the second arm 48b of the sensing arrangement 40 is supported by and able to move on a linear guide 100b in an axial direction relative to the base section 24 of the second holding means 16. This movement is limited in a direction towards the first holding means by means of a stop 102b on the base section 24, against which the second arm 48b can strike. A cantilever spring arrangement (not depicted) biases the second arm 48b in the direction of the stop 102b.

If the second arm 48b is situated in contact with the stop 102b of the base section 24, then the optical axis L1 of the illumination means 44 supported on the second arm is located on the optical axis L2 of the camera 42, so the sensing arrangement is ready to sense the tool and, in particular, the illumination means is placed in the proper position for illuminating the tool in the area of the second reference point. The cantilever spring arrangement reliably holds the second arm 48b at the stop 102b so that any axial movement of the second holding means 16 in relation to the first holding means 12 also moves the second arm 48b, and the optical axes L1 and L2 remain oriented with respect to one another.

As the second holding means 16 is coming into close proximity with the first holding means 12, the second arm 48b ultimately comes into contact with a section associated with the first holding means 12 at some point in time just before or during the insertion of the tool into the tool receptacle. In the embodiment shown in FIG. 8, the second arm 48b strikes against the heating means 86, which at this point is attached to and has opened the tool receptacle.

As a result, the heating means 86 stops and limits the axial movement of the second arm 48b. If the second holding means 16 is moved beyond this location further in the direction of the first holding means 12 in order to insert the tool at the desired axial position into the tool receptacle, then the arm 48b will lift up from the stop 102b against the force of the cantilever spring arrangement (the position as shown in FIG. 8). If, for example, a heating means having large dimensions (such as a heating arrangement with an integrated cooling arrangement) is used in the second embodiment, then the arm 48b giving way nevertheless allows the two holding means to come into sufficiently close proximity.

The cantilever spring arrangement can assume a further advantageous function in removing the tool from the tool receptacle: For this purpose, the second holding means 16 is moved until coming into close proximity with the first holding means 12 (the position shown in FIG. 8) so that the second arm 48b is lifted up from the stop 102b against the force of the cantilever spring arrangement. The second holding means is subsequently actuated so as to hold the tool in position. The clamping force of the holding means thereby is greater than the returning force of the cantilever spring arrangement. As a result, the force of the cantilever spring arrangement then acts between the tool and the tool receptacle. As soon as the tool receptacle opens (for example when the tool receptacle is heated in the case of a shrink-fitting device) the cantilever spring arrangement will automatically pull the tool out of the tool receptacle.

The invention claimed is:

1. A device for inserting a tool into a tool receptacle comprising:
    a first holding means, which is configured to hold the tool receptacle;
    a second holding means, which is configured to hold the tool;
    a linear guide, which enables movement of the second holding means in relation to the first holding means in an axial direction running along or parallel to a main axis in order to move the tool closer to the tool receptacle and insert the tool into the tool receptacle;
    a sensing arrangement, which is able to move in an axial direction and is configured to sense in a contact-free manner an axial position of a first reference point associated with the first holding means and to sense in a contact-free manner an axial position of a second reference point for the tool held by the second holding means; and
    a measuring arrangement, which measures an axial displacement path of the sensing arrangement,
    wherein the sensing arrangement is connected to the second holding means and moves together with the second holding means on the linear guide in an axial direction.

2. The device according to claim 1, wherein the second holding means comprises a base section, which is supported by and able to move in an axial direction on the linear guide, and a carriage, which is supported by and able to move in an axial direction on the base section, wherein the carriage features retaining means for retaining the tool.

3. The device according to claim 1 further comprising a stop, which is adjustable in an axial direction and is able to be fixed at each of various axial positions, wherein the stop is configured to limit an axial movement of the second holding means along the linear guide.

4. The device according to claim 1, wherein the first holding means comprises:
    a frame element;
    a chucking device, which is able to be mounted on the frame element and features a first coupling means for coupling with the tool receptacle; and
    a calibration member which is able to be mounted on the frame element instead of the chucking device,
    wherein the first reference point is provided on an edge or surface of the calibration member that is able to be sensed in a contact-free manner.

5. The device according to claim 4, wherein an axial length of the calibration member is equal to an axial length of the chucking device, and wherein the first reference point can be provided on an axial end of the calibration member facing away from the frame element.

6. A device for inserting a tool into a tool receptacle, comprising:
    a first holding means, which is configured to hold the tool receptacle;
    a second holding means, which is configured to hold the tool;
    a linear guide, which enables movement of the second holding means in relation to the first holding means in an axial direction along or parallel to a main direction in order to move the tool closer to the tool receptacle and insert the tool into the tool receptacle;
    wherein the second holding means features a clamping arrangement having at least one first engaging element and one second engaging element, wherein the engaging elements are arranged to be able to move with respect to one another in order to hold tool the tool in clamping engagement between the engaging elements at a setpoint position or to release the tool, wherein the second holding means features a spring arrangement, which enables movement of the engaging elements elastically in a direction orthogonal to the main axis.

7. The device according to claim 6, wherein the second holding means features a base section, which is supported by and able to move in an axial direction on the linear guide, and a carrying section, which carries the clamping arrangement, wherein the spring arrangement is arranged between the clamping arrangement and the carrying section such that the clamping arrangement uses the elasticity of a spring to move within a dynamic range in relation to the carrying section.

8. The device according to claim 6, wherein the clamping arrangement features a central axis, which runs in an axial direction through a mid-point between the two engaging elements and coincides with the central axis of the tool when the tool has been clamped, wherein the engaging elements are by way of the clamping arrangement able to move in a uniform manner towards or away from one another in a radial direction.

9. The device according to claim 6 further comprising at least one of a pneumatic, hydraulic, or an electric drive means, by way of which at least one of the two engaging elements is able to be moved between an engaging position and a clamping position.

10. The device according to claim 6 wherein the engaging elements each feature contact sections, which are configured to enter into clamping contact with the tool held in clamping engagement, wherein the contact sections are each formed by walls of an axial groove.

11. The device according to claim 6 further comprising:
a sensing arrangement, which is able to move in an axial direction and which is configured to sense in a contact-free manner at least one of (i) an axial position of a first reference point associated with the first holding means and (ii) an axial position of a second reference point for the tool held by the second holding means; and
a measuring arrangement, which measures an axial displacement path of the sensing arrangement.

12. The device according to claim 6, wherein the device features a sensing arrangement, which is configured to sense in a contact-free manner an axial position of a second reference point for the tool held by the clamping arrangement, and wherein the clamping arrangement is provided on a carriage, which is supported to be able to move in an axial direction relative to the sensing arrangement, so that the reference point for the tool can be sensed by the sensing arrangement.

13. The device according to claim 6, wherein the tool is a rotating tool, and wherein the tool receptacle is a tool chuck for receiving the rotating tool.

14. The device claim 6, wherein the device is a shrink-fitting device; and
wherein the device comprises a heating means for heating the tool receptacle held on the first holding means and a cooling means for cooling the tool receptacle.

15. The device according to claim 14, wherein the cooling means for cooling the tool receptacle is integrated into a housing for the heating means.

16. The device according to claim 14, wherein the cooling means is configured to, following a heating process, cool the tool receptacle held on the first holding means by way of spraying a fluid.

17. The device according to claim 16, wherein the cooling means comprises three or more outlet openings for carbon dioxide ($CO_2$), which are oriented towards the tool receptacle and are symmetrically distributed around a circumference of the tool receptacle.

18. The device according to claim 6, wherein the second holding means comprises:
a base section, which is supported by and able to move in an axial direction on the linear guide;
a cantilever section, which is supported by and able to move in an axial direction with respect to the base section, said cantilever section carrying a component of a sensing arrangement; and
a cantilever spring arrangement, which biases the cantilever section in an axial direction towards the base section and towards the first holding means,
wherein the base section features a stop, which limits an axial movement of the cantilever section.

19. A method for inserting a tool into a tool receptacle, comprising the steps of:
providing the tool receptacle and the tool at an axial distance from one another;
sensing in a contact-free manner the axial position of a first reference point associated with the tool receptacle;
sensing in a contact-free manner the axial position of a second reference point associated with the tool;
opening the tool receptacle;
inserting the tool into the tool receptacle such that a distance between the first reference point and the second reference point assumes a predetermined setpoint value; and
closing the tool receptacle.

20. The method according to claim 19, wherein a device is used which comprises:
a first holding means, which is configured to hold the tool receptacle;
a second holding means, which is configured to hold the tool;
a linear guide, which enables movement of the second holding means in relation to the first holding means in order for the tool to move closer to the tool receptacle and be inserted into the tool receptacle;
a sensing arrangement, which is axially movable and which is configured to sense in a contact-free manner an axial position of a first reference point associated with the first holding means and to sense in a contact-free manner an axial position of a second reference point for the tool held by the second holding means; and
a measuring arrangement, which measures an axial displacement path of the sensing arrangement,
wherein the method further comprises the following steps:
moving the sensing arrangement in an axial direction by a predetermined axial displacement path upon sensing the axial position of the first reference point;
setting a positioning means according to the axial position of the sensing arrangement;
inserting the tool into the second holding means, wherein the axial position of the second reference point is sensed for the tool held by the second holding means;

moving the second holding means and the first holding means closer together such that the tool penetrates into the tool receptacle upon opening the tool receptacle;

the movement together being stopped by the positioning means; and releasing the tool from the second holding means upon closing the tool receptacle.

* * * * *